United States Patent [19]
Genuit et al.

[11] 3,843,907
[45] Oct. 22, 1974

[54] ADJUSTABLE OVER-CURRENT DETECTOR
[75] Inventors: Luther L. Genuit, Scottsdale; John R. Nowell, Phoenix, both of Ariz.
[73] Assignee: Honeywell Information Systems Inc., Waltham, Mass.
[22] Filed: Nov. 7, 1973
[21] Appl. No.: 413,731

[52] U.S. Cl. .......................... 317/27 R, 307/235 R
[51] Int. Cl. .............................................. H02h 3/36
[58] Field of Search ............... 307/235 R; 317/27 R; 321/2

[56] References Cited
UNITED STATES PATENTS
3,372,234   3/1968   Bowsher et al. ................ 307/235 X
3,518,526   6/1970   Genuit .................................. 321/2
3,584,259   6/1971   Traub .............................. 317/27 R
3,644,788   2/1972   Maenicke ........................ 317/27 R Primary Examiner—James D. Trammell
Attorney, Agent, or Firm—Lloyd B. Guernsey; Edward W. Hughes

[57] ABSTRACT

An over-current detector monitors the current delivered by each section of a multi-section switching regulator and provides a signal for disabling the switching regulator when the current in any one of the sections exceeds a threshold value. The threshold value is adjustable so that the multi-section switching regulator can be used to safely deliver a wide range of values of current.

4 Claims, 4 Drawing Figures

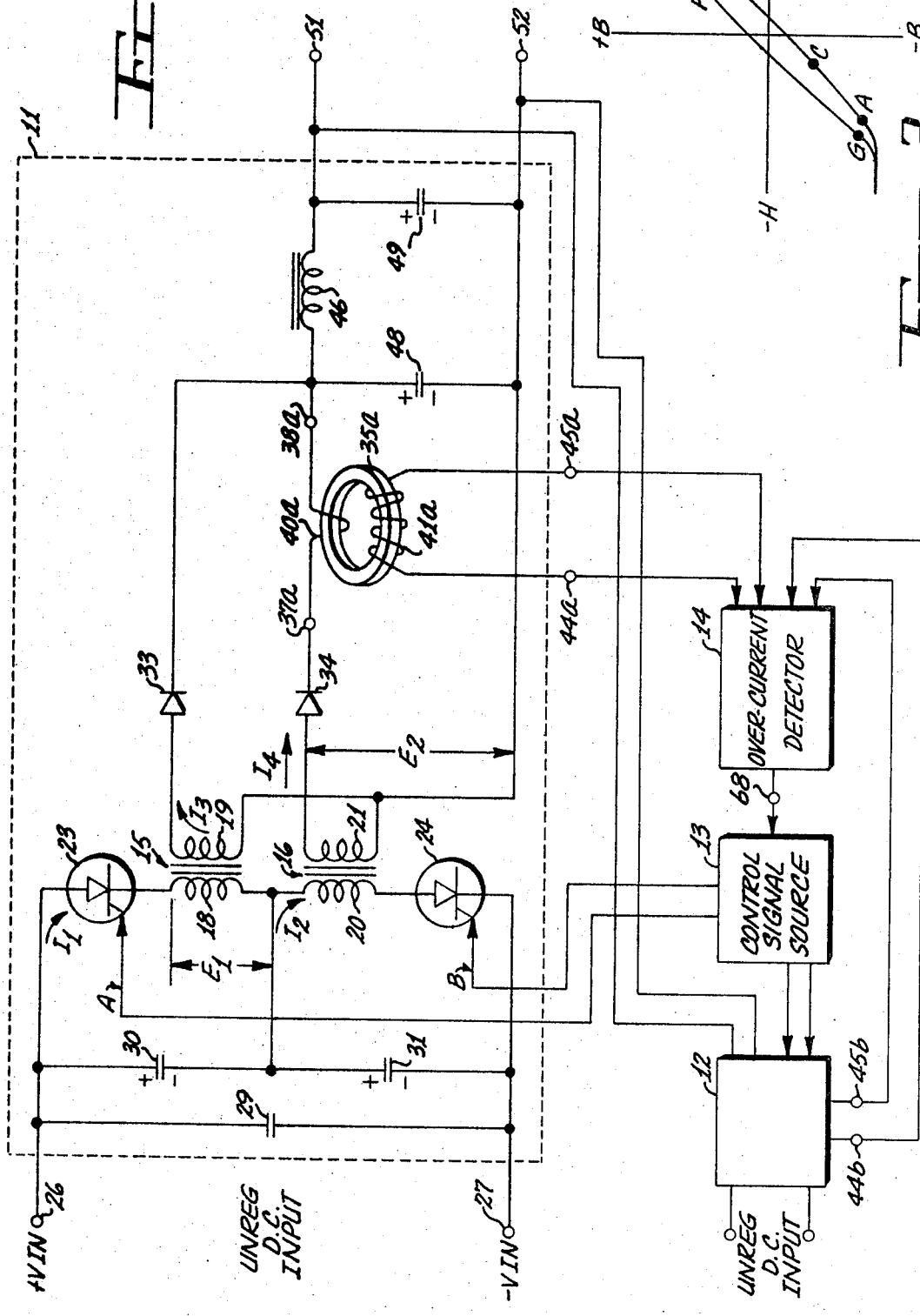

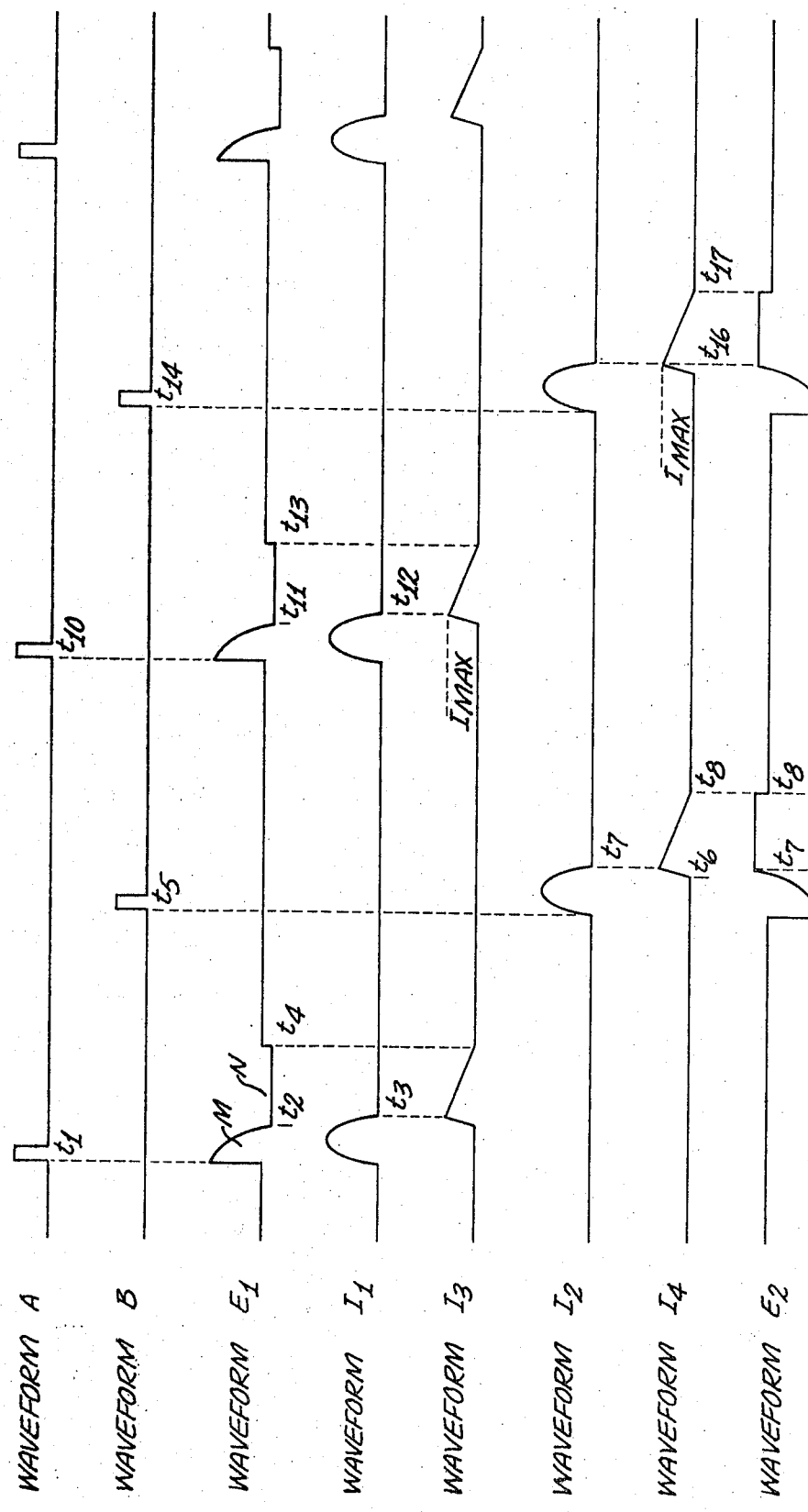

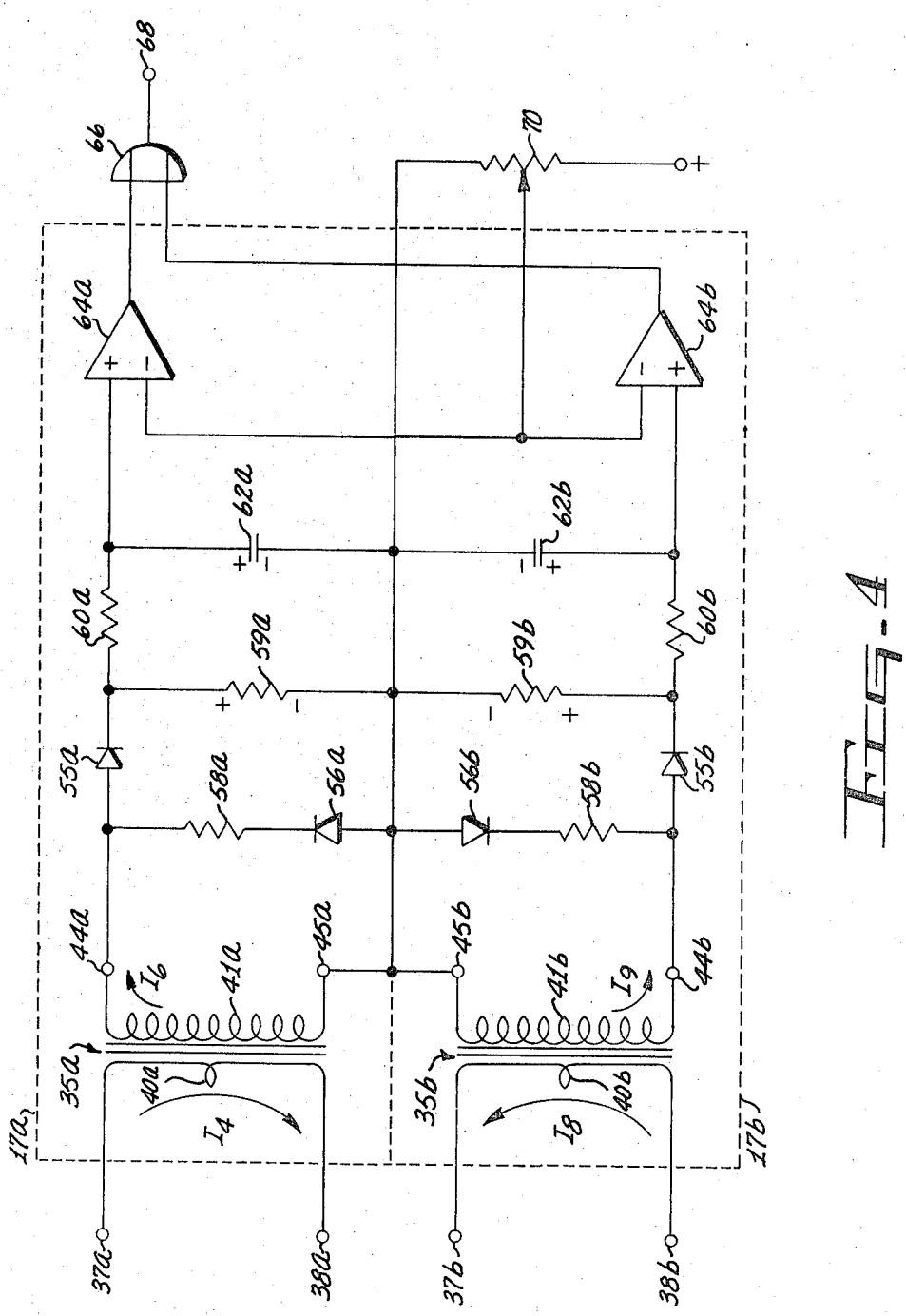

ADJUSTABLE OVER-CURRENT DETECTOR

BACKGROUND OF THE INVENTION

The invention relates to switching regulators and more particularly to over-current detectors which monitor the current delivered by a multi-section switching regulator and provide a signal for disabling the regulator when the current in any of the sections exceeds a threshold value.

In high speed data processing systems, microcircuits are used to reduce the physical size of the system and to increasing the operating speed. These microcircuits are built in modules each of which may replace a large number of circuits using discrete circuit components. Each of these microcircuit modules requires as much power as several circuits using discrete components so that the power required in a single cabinet of a data processing system using microcircuit modules is several times as large as the power required in a single cabinet using discrete components when the two cabinets have the same physical size. In addition, high speed microcircuits usually use a much smaller value of d.c. voltage than circuits employing discrete components. For example, in many high speed microcircuits the required d.c. voltage may be less than 5 volts. This voltage must be well regulated to provide a constant value of d.c. voltage for the microcircuits otherwise variations in d.c. voltage may produce error signals in the data processing system.

Many of the power supply systems employ switching regulators to provide the low value of well regulated voltage for the data processing systems. The a.c. voltage from a power supply line is converted to a relatively large value of unregulated d.c. voltage at a plurality of locations in the data processing system. This relatively large value of unregulated d.c. voltage can be converted to a relatively small value of d.c. voltage by the switching regulators at various locations in the data processing systems. Each of the switching regulators may employ a transformer, a pair of silicon controlled rectifiers and a source of signal to convert the unregulated d.c. voltage, such as 150 volts, to an accurately regulated voltage, such as 5 volts. The silicon controlled rectifiers are employed as switches between the source of unregulated d.c. voltage and the transformer. The silicon controlled rectifiers are located on the "high" voltage side of the transformer where the current and power losses in these rectifiers are low, thereby causing the switching regulator to have a high degree of efficiency. The regulated d.c. voltage obtained from a secondary winding on the transformer is supplied to a pair of voltage output terminals. The transformer provides isolation between the regulated d.c. voltage and the source of unregulated d.c. voltage so that a short circuit in a silicon controlled rectifier will not cause damage to the microcircuit modules which provide the load on the switching regulator.

The silicon controlled rectifier is a semiconductor device having an anode, a cathode and a gate. The silicon controlled rectifier can be used as an ON-OFF switch which can be turned on in a very few microseconds. Normally, the silicon controlled rectifier cannot conduct current between anode and cathode thereof until a pulse of current larger than a threshold value flows from gate to cathode. If a positive voltage difference exists between the anode and the cathode when a pulse of current flows from the gate, the silicon controlled rectifier "fires" i.e., is rendered conductive and the current will flow from the anode to the cathode. Once anode-cathode flow commences, the gate has no further control over such current flow. Current flow from anode to cathode in a rectifier can be terminated only by reducing the anode to cathode current below a holding or minimum current value. A more detailed description of the operation of a silicon controlled rectifier can be found in "The Silicon Controlled Rectifier Manual," 4th Edition, 1967, published by the General Electric Company, Syracuse, N.Y.

A signal source is coupled to the voltage output terminals of the switching regulator and develops trigger signals whose frequency is determined by the value of voltage at the voltage output terminal. The trigger signals are coupled to the silicon controlled rectifiers in the switching regulator and cause these rectifiers to deliver energy through the transformer to output filter capacitors which are connected to the voltage output terminal. The signal source senses any change in the value of the trigger signals delivered to the switching regulator. This change in frequency of the trigger signals causes a change in the "duty cycle" of the switching regulator. The duty cycle is a duration of time that energy is delivered to the output filter capacitors compared to the total duration of time between trigger signals. This change in the frequency of the trigger signals and in the duty cycle causes a change in the quantity of energy which the switching regulator delivers to the output filter capacitor so that the voltage at the output terminal returns to the original value.

It is desirable to monitor the current which the switching regulator delivers to a load and to provide a signal which will disable the regulator when the current delivered exceeds a threshold value. In a dual switching regulator or in a multi-section type of switching regulator it is desired that the current delivered to the load by each of the sections of the switching regulator be monitored and a signal provided which disables all sections of the switching regulator when the current delivered by any of the sections exceeds a threshold value. It is also desirable that the threshold value of this current be adjustable so that the switching regulator can be used with different loads which may require different values of current.

It is, therefore, an object of this invention to provide a new and improved over-current detection circuit for use with a switching regulator.

Another object of this invention is to provide an over-current detector which provides a signal which disables the switching regulator when the current from the regulator exceeds a threshold value.

A further object of this invention is to provide an over-current detector which disables all of the sections of a multi-section switching regulator when the current from any of the sections on the regulator exceeds the threshold value.

Another object of this invention is to provide an over-current detector having means for adjusting the threshold value of current which can be delivered by any of the sections of a multi-section switching regulator.

SUMMARY OF THE INVENTION

The foregoing objects are achieved in the present invention by providing a new and improved over-current detector for monitoring the current delivered by each of the sections of a multi-section switching regulator and for providing an output signal when the current in any of the sections of the regulator exceed a threshold value. The present invention includes means for adjusting the threshold value of the current which may be delivered by any of the sections of the switching regulator.

Other objects and advantages of this invention will become apparent from the following description when taken in connection with the accompanying drawings.

BRIEF DESCRIPTION OF THE DRAWINGS

FIG. 1 is a schematic drawing of a switching regulator and its associated control circuits including the present invention;

FIG. 2 illustrates a magnetization curve which is useful in explaining the operation of the circuit shown in FIG. 1;

FIG. 3 illustrates waveforms which are useful in explaining the operation of the circuit of FIG. 1; and FIG. 4 is a schematic drawing of one embodiment of the present invention.

DESCRIPTION OF THE PREFERRED EMBODIMENT

Referring more particularly to the drawings by the characters of reference, FIG. 1 discloses a power supply system which is designed to provide a constant supply of d.c. output voltage for a wide range of values of output current and for monitoring the current delivered to a load which may be connected to the system. As indicated in FIG. 1 the system comprises a pair of switching regulator sections 11 and 12, a control signal source 13 for providing trigger signals to the switching regulator and a circuit 14 for monitoring the current delivered by each of switching regulator sections 11 and 12. The control signal source 13 detects any change in voltage at the output terminals of the switching regulators and provides a signal whose value is determined by the change in the output voltage. The control signal source develops pulses having a frequency which is determined by the value of voltage at the output terminal 51A of the switching regulator.

As indicated in FIG. 1 switching regulator section 11 includes a pair of transformers 15 and 16, each having a primary winding and a secondary winding. The primary windings 18 and 20 are connected in series and coupled to a high voltage unregulated d.c. power supply having a positive output terminal 26 and a negative output terminal 27. A pair of silicon controlled rectifiers 23 and 24 control the current supplied by the power supply to the primary windings of transformers 15 and 16. The anode of silicon controlled rectifier 23 is connected to the positive terminal 26 of the unregulated d.c. power supply and the cathode of silicon controlled rectifier 23 is connected to the upper end of primary winding 18. The gate of silicon controlled rectifier 23 is connected to one lead of the control signal source 13 which provides trigger signals to render rectifier 23 conductive. The anode of silicon controlled rectifier 24 is connected to the lower end of primary winding 20 and the cathode of silicon controlled rectifier 24 is connected to the negative terminal of the unregulated d.c. power supply. A second lead from the control signal source 13 is connected to the gate of silicon controlled rectifier 24 to provide trigger signals to render rectifier 24 conductive.

The magnetic core employed in transformers 15 and 16 produces the magnetization characteristics illustrated in the magnetization curve of FIG. 2. The magnetizing force H is equal to the product of the number of turns in a winding on the transformer core and the number of amperes of current for each turn of wire divided by the length of the core. Since the physical length of the particular transformer core is constant the magnetizing force of the transformer is often expressed as the number of amperes times the number of turns, or "ampere turns." The flux density B is the number of lines of flux per square centimeter of the transformer core and is determined by the value of the magnetizing force and the type of material used in the core. A discussion of the magnetization curves can be found in the textbook "Magnetic Circuits and Transformers" by E. E. Staff, MIT, 1943, published by John Wylie & Sons, New York, N.Y.

The operation of the circuit of FIG. 1 will now be discussed in connection with the magnetization curve shown in FIG. 2 and the waveforms shown in FIG. 3.

A pair of capacitors 30 and 31 provide predetermined quantities of electrical energy to the transformers 15 and 16 each time one of the silicon controlled rectifiers 23 and 24 is rendered conductive. Each time one of the silicon controlled rectifiers 23 and 24 is rendered nonconductive the same predetermined quantity of energy is delivered by one of the transformers 15 and 16 through diodes 33 and 34 to a filter capacitor 48. Prior to time t1 shown in FIG. 3, capacitor 30 of FIG. 1 is charged to the polarity shown in FIG. 1. At time t1 a pulse of current from the control signal source 13 renders silicon controlled rectifier 23 conductive so that the voltage across the capacitor 30 is applied to the primary winding 18 of transformer 15 causing a current I1 to flow from the upper plate of capacitor 30 through anode to cathode of rectifier 23, through primary winding 18 to the lower plate of capacitor 30. The current I1 through primary winding 18 causes a change of flux in the transformer core and causes the operating point to move from point A toward point C of the magnetization curve in FIG. 2. This change in the flux produces a voltage across primary winding 18, which limits the rate of increase in current through silicon controlled rectifier 23, thus preventing possible damage to rectifier 23. A positive voltage applied to the upper end of primary winding 18 causes the operating point to move from point C toward point D. The distance between point C and point D is proportional to the product of the voltage applied to the primary winding 18 and the duration of time this voltage is applied.

The voltage applied to primary winding 18 is magnetically coupled through the transformer core to the secondary winding 19. Between time t1 and time t2 secondary winding 19 has a positive value of voltage at the lower end of the winding and a negative value of voltage at the upper end of the winding. At this time, the voltage across the secondary winding 19 causes diode 33 to be back biased so that no current flows through the diode or through the secondary winding 19. Capacitor 30 provides current I1 until this capacitor has discharged at time t2 as shown in waveform E1 of FIG. 3. The area M under the curve of waveform E1 between time t1 and t2 is the sum of the products of the voltage applied to primary winding 18 and the duration of time the voltage is applied, and this area M represents the total energy stored in the core of transformer 15. When the voltage applied to primary winding 18 has a zero value at time $t2$ the operating point on the magnetization curve of FIG. 2 reaches point D.

At time $t2$ the energy stored in the core of transformer 15 reverses the polarity of voltage across each of the transformer windings so that a negative polarity of voltage is developed at the upper end of primary winding 18. This negative polarity of voltage at the upper end of primary winding 18 causes the operating point in FIG. 2 to move from point D to point E and to begin moving toward point A. Again the distance between point E and point A is proportional to the product of the voltage across primary winding 18 and the duration of time this voltage is applied. The area N under the curve of waveform E1 between times t2 and $t4$ is the sum of the products of the voltage across primary winding 18 and the time this voltage is applied. In this area N represents the total energy which the core of transformer 18 returns through the transformer. The voltage across primary winding 18 causes the current I1 to charge capacitor 30 to a polarity opposite to the polarity shown in FIG. 1.

The energy in the core of transformer 15 causes the voltage across secondary winding 19 to increase to a value larger than the voltage across filter capacitor 48 so that a current I3 flows through diode 33 to charge capacitor 48. The energy which is stored in the core of transformer 15 when silicon controlled rectifier 23 conducts is proportional to the difference between the flux at point A and point B on the magnetization curve of FIG. 2; and the energy which is transferred to the secondary winding 19 when silicon controlled rectifier 23 is rendered nonconductive, is proportional to the difference between the flux at point E and point A.

Since the distance between point A through point C to point D shown in FIG. 2 is substantially the same as the distance between points E through points F to point A, substantially all the energy which was stored in the core of the transformer between times $t1$ and $t2$ is returned and stored in capacitors 48 and 49. Capacitor 30 delivers substantially the same amount of energy to the transformer each time the silicon controlled rectifier 23 is rendered conductive so that the amount of energy delivered to capacitors 48 and 49 and the voltage across these capacitors is determined by the frequency of the signals applied to the gate of rectifier 23.

Capacitor 31 also provides a predetermined quantity of energy to the transformer 16 each time silicon controlled rectifier 24 is rendered conductive. Prior to time $t5$, capacitor 31 is charged to the polarity shown in FIG. 1. At time $t5$ a pulse of current from the control signal source 13 renders silicon controlled rectifier 24 conductive so that a current I2 flows from the upper plate of capacitor 31 through the primary winding 20, from anode to cathode of rectifier 24 to the lower plate of capacitor 31. Current I2 to the primary winding and the voltage impressed across this winding causes the operating point of the characteristic curve in FIG. 2 to move from point A through point C to point D and causes a predetermined quantity of energy to be stored in the core of transformer 16. When silicon controlled rectifier 24 is rendered nonconductive, this energy is transferred to the secondary winding 21 causing a current I4 to charge capacitor 48 as described above.

The amount of voltage across capacitors 48 and 49 can be controlled by controlling the frequency of the trigger signals which control signal source 13 applies to the gates of silicon controlled rectifiers 23 and 24. When an increase in the amount of current drawn by a load (not shown) connected across output terminals 51 and 52 in FIG. 1 causes the value of the output voltage to fall below a predetermined reference level, the frequency of the signals from the control signal source 13 increases. This increase in the frequency of the output signals causes an increase in the rate of energy delivered to filter capacitors 48 and 49 and increases the voltage at the output terminals 51 and 52 to the predetermined reference level. The voltage at the output terminal 51 of the power supply controls the frequency of the signals from the control signal source 13 so that the voltage from the output terminals 51 and 52 is substantially constant even when the current drawn from the power supply varies over a wide range of values. A more detailed description of the operation of the switching regulator can be found in the U.S. Pat. No. 3,518,526 by Luther L. Genuit, issued June 30, 1970, entitled "Switching Regulator."

Current Detector Circuit

As indicated in FIG. 4, the circuit for detecting the value of current delivered by the switching regulator comprises a pair of over-current detector circuits 17a and 17b, an OR-gate 66 and a potentiometer 70. Each of the over-current detector circuits includes a transformer 35 having a primary winding 40 and a secondary winding 41, a plurality of resistors 58–60, a pair of diodes 55 and 56, a capacitor 62 and a voltage comparator 64.

The voltage comparator 64 is a device having a first or positive input lead, a second or negative input lead and an output lead. The voltage received at the positive input lead is compared with the voltage received at the negative input lead and the amplifier produces a voltage at the output lead which is determined by the difference between the voltages at the positive and the negative input leads. The voltage at the output lead is low before a threshold value of difference between the positive and the negative leads exists. The output voltage increases rapidly when the difference between the positive and the negative input voltages rises above the threshold value. A voltage comparator which can be used in the circuit of FIG. 4 is the LM339 which is manufactured by the National Semiconductor Corporation and described in the "Linear Integrated Circuits" handbook from National Semiconductor Corporation, Santa Clara, Calif. 1973.

The OR logic signals are developed by OR-gates which provide the logical operation of inclusive-OR for positive signals applied thereto. The OR-gate provides an output signal representing a binary one, when any one or more of the input signals applied thereto represent binary ones. When none of the input signals represent binary ones, the output signals represent a binary zero. The symbol identified by reference numeral 66 represents an OR-gate having two input terminals.

The primary winding 40 of transformer 35 is connected between the rectifier 34 and the capacitor 48 of FIG. 1. The primary winding 40 includes a single turn of wire through the opening in the center of a toroidal core as shown in FIG. 1. The secondary winding 41 may include approximately 600 turns of wire. The core of the transformer 35 is made of a high permeability material such as ferrite which operates at a low flux density and functions as a current transformer. The sawtooth diode current shown in waveform 14 of FIG. 3 passes through the primaru winding 40a and produces a corresponding current 16 having the same shape of waveform as current 14 but greatly reduced in amplitude. In a typical design with a one turn primary winding the peak current pulse through the primary is approximately 60 amperes while the corresponding peak current through the 600 turn secondary would be 0.1 amperes. The current 16 flows from the upper end of winding 41a to terminal 44a, through diode 55a and resistor 59a to the lower end of winding 41a. In a typical circuit resistor 59a may have a value of 30 ohms so the voltage developed across resistor 49a is 0.1 amps times 30 ohms or 3 volts.

The voltage pulse developed across resistor 59a is integrated by resistor 60a and capacitor 62a and the resultant d.c. voltage is applied to the positive or noninverting input lead of the voltage comparator 64a. The voltage at the positive input of comparator 64a is compared with the voltage from the potentiometer 70 which is applied to the negative input of the comparator and the resultant output voltage is applied to one lead of the OR-gate 66. The OR-Gate 66 delivers a voltage to output terminal 68 which is the larger of the two voltages supplied to the input voltages of the OR-gate. The over-current detector shown in FIG. 4 includes two sections so that a dual switching regulator can be used with this over-current detector. It should be understood that other sections may be added to the over-current detector of FIG. 4 so that more sections of the switching regulator may be used with this over-current detector. A single section of the over-current detector without OR-gate 66 may be used to provide over-current protection for a single switching regulator.

In the circuit shown in FIG. 4 if either section of the switching regulator which is connected to the input terminals 37 and 38 should become defective the other section of the switching regulator would try to provide the current which is normally supplied by the defective half of the regulator. This would cause the current flowing through the primary winding 40 of the transformer 35 to increase so that the current in the secondary winding 41 increases. The increased current in the secondary winding increases the value of voltage across the capacitor 62 and causes the comparator 64 to provide a high value of voltage to the output terminal 68 through the OR-gate 66. This high value of voltage provides a signal which disables the control signal source of FIG. 1 and causes all portions of the switching regulator to be shut down thereby protecting the functioning switching regulator from overloading.

While the principles of the invention have now been made clear in an illustrative embodiment, there will be many obvious modifications of the structure, proportions, materials and components without departing from those principles. The appended claims are intended to cover any such modifications.

We claim:

1. An over-current detector for use with a switching regulator, said detector comprising:
    first and second input terminals;
    a current transformer having a primary winding and a secondary winding, said first input terminal being connected to a first end of said primary winding, said second input terminal being connected to a second end of said primary winding;
    first and second diodes each having an anode and a cathode, said anode of said first diode being connected to a first end of said secondary winding, said anode of said second diode being connected to a second end of said secondary winding;
    first, second and third resistors, said first resistor being connected between said cathode of said second diode and said first end of said secondary winding, said second resistor being connected between said cathode of said first diode and said second end of said secondary winding;
    a voltage comparator having first and second input leads and an output lead, said third resistor being connected between said cathode of said first diode and said first input lead of said comparator;
    a capacitor, said capacitor being connected between said first input lead of said comparator and said second end of said secondary winding; and
    a reference potential, said potential being coupled to said second input lead of said comparator.

2. An over-current detector for use with a dual switching regulator, said detector comprising:
    first and second current transformers each having a primary winding and a secondary winding;
    first, second, third and fourth input terminals, said first terminal being connected to a first end of said primary winding of said first transformer, said second terminal being connected to a second end of said primary winding of said first transformer, said third terminal being connected to a first end of said primary winding of said second transformer, said fourth terminal being connected to a second end of said primary winding of said second transformer;
    first and second rectifiers each having an anode and a cathode, said anode of said first rectifier being connected to a first end of said secondary winding of said first transformer, said anode of said second rectifier being connected to a first end of said secondary winding of said second transformer;
    first and second resistors, said first resistor being connected between said cathode of said first rectifier and a second end of said primary winding of said first transformer, said second resistor being connected between said cathode of said second rectifier and a second end of said primary winding of said second transformer;
    first and second integrator circuits each having first and second input leads and an output lead, said first input lead of each of said circuits being connected to said cathode of a corresponding one of said rectifiers, said second input lead of each of said circuits being connected to said second ends of said secondary winding of said first and said second transformers;
    first and second voltage comparators each having first and second input leads and an output lead, said first input lead of said first comparator being connected to said output lead of said first circuit, said first input lead of said second comparator being connected to said output lead of said second circuit;
    a reference potential, said potential being coupled to said second input leads of said first and said second comparators; and an OR-gate having first and second input leads and an output lead, said first input lead of said gate being connected to said output lead of said first comparator, said second input lead of said gate being connected to said output lead of said second comparator.

3. An over-current detector as defined in claim 2 including:

third and fourth rectifiers each having an anode and a cathode, said anode of said third rectifier being connected to said second end of said secondary winding of said first transformer, said anode of said fourth rectifier being connected to said second end of said secondary winding of said second transformer; and third and fourth resistors, said third resistor being connected between said cathode of said third rectifier and said first end of said secondary winding of said first transformer, said fourth resistor being connected between said cathode of said fourth rectifier and said first end of said secondary winding of said second transformer.

4. An over-current detector as defined in claim 2 including:

third and fourth rectifiers each having an anode and a cathode, said anode of said third rectifier being connected to said second end of said secondary winding of said first transformer, said anode of said fourth rectifier being connected to said second end of said secondary winding of said second transformer;

third and fourth resistors, said third resistor being connected between said cathode of said third rectifier and said first end of said secondary winding of said first transformer, said fourth resistor being connected between said cathode of said fourth rectifier and said first end of said secondary winding of said second transformer; and a potentiometer having first and second input leads and an output lead, said first input lead of said potentiometer being connected to said reference potential, said second input lead of said potentiometer being connected to said anodes of said third and said fourth rectifiers, said output lead of said potentiometer being connected to said second input leads of said first and said second comparators.

* * * * *